No. 706,312. Patented Aug. 5, 1902.
J. J. GALWAY.
DEVICE FOR SECURING OR RELEASING TRAP FLOORS FOR ORE CARS.
(Application filed Mar. 25, 1902.)
(No Model.)
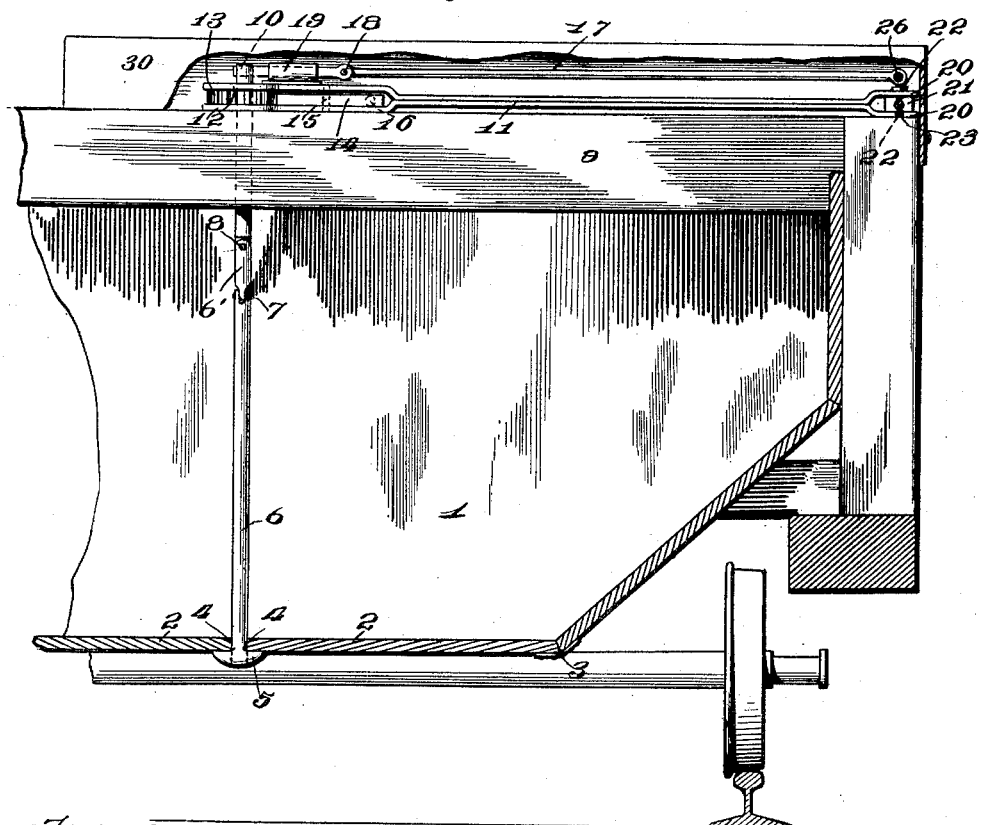
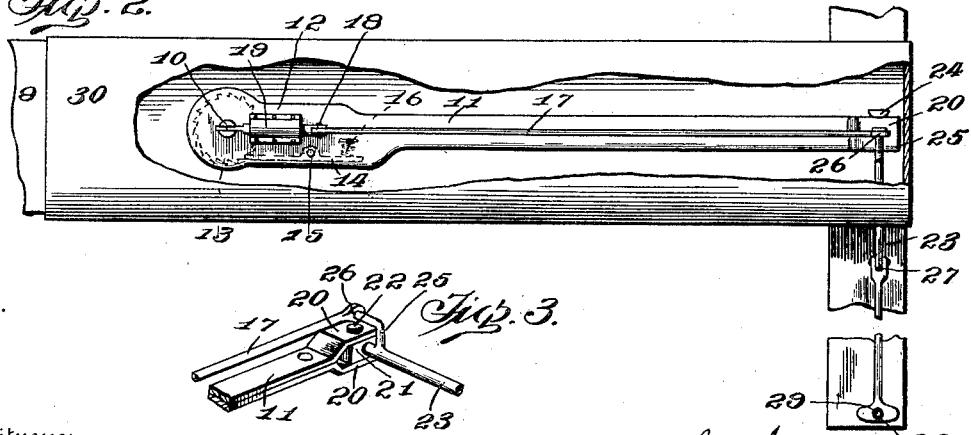

UNITED STATES PATENT OFFICE.

JOHN J. GALWAY, OF DULUTH, MINNESOTA.

DEVICE FOR SECURING OR RELEASING TRAP-FLOORS FOR ORE-CARS.

SPECIFICATION forming part of Letters Patent No. 706,312, dated August 5, 1902.

Application filed March 25, 1902. Serial No. 99,944. (No model.)

*To all whom it may concern:*

Be it known that I, JOHN J. GALWAY, a citizen of the United States, residing at Duluth, in the county of St. Louis and State of Minnesota, have invented certain new and useful Improvements in Devices for Securing or Releasing Trap-Floors of Ore-Cars; and I do hereby declare the following to be a full, clear, and exact description of the invention, such as will enable others skilled in the art to which it appertains to make and use the same.

This invention relates to improvements in ore-cars, and more particularly to mechanism for controlling the trap-doors thereof.

The object in view is the provision of means, in connection with an ore-car, designed to facilitate the release of the trap-doors thereof and capable of operation from outside the car.

With this and other objects in view it consists, in combination with an ore-car, of a rod supporting the doors of the trap of said car in a normal closed condition and means extending outside said car for rotating said rod for releasing said trap-doors.

It also consists in certain other novel constructions, combinations, and arrangements of parts, as will be hereinafter fully described and claimed.

In the accompanying drawings, Figure 1 represents a transverse vertical section through a portion of an ore-car having one embodiment of the present invention applied thereto. Fig. 2 represents a top plan view of the same. Fig. 3 represents an enlarged detail view of the connections between the operating-shafts.

The accompanying drawings represent any ordinary form of ore-car with my improvements applied thereto, the numeral 1 therein representing the ore-pocket in the bottom of the car, which is provided with the ordinary form of trap-doors 2, hinged in the usual manner, as at 3, and having their inner edges meeting when closed, each being formed with a notch, as at 4, in the said inner edge, said notches registering when the doors 2 are in their closed position for forming a slot through which the T-shaped head 5 of rod 6 is designed to be passed. The rod 6 may be pivoted, as at 7, to an upper rod 6', and, if desired, a second pivotal connection, as at 8, may be provided, the pivots 7 and 8 being at right angles to each other, whereby lateral movement of the rods 6 and 6' may be had in either direction without danger of bending either. The rod 6' preferably passes upwardly through a suitable transverse beam, as 9, and is slotted at its upper end, as at 10. A lever, as 11, is arranged above beam 9 and bifurcated at its inner end, forming arms 12 12. A suitable ratchet-wheel, as 13, is revolubly mounted between said arms 12 and surrounds and is keyed or otherwise secured to rod 6' near the upper end thereof. A pawl, as 14, is pivoted, as at 15, between the arms 12 and is pressed at one end by a suitable spring, as 16, for retaining the opposite end in engagement with ratchet 13. A bolt, as 17, extends approximately parallel with lever 11 and spaced above the same, said bolt being preferably formed intermediate its length with any suitable jointed connection, as at 18, and extending through a guiding-box, as 19, preferably secured to the upper arm 12, the inner end of said bolt normally extending through the slot 10.

The outer end of lever 11 is preferably bifurcated, forming arms 20 20, between which is pivoted a suitable swivel-block, as 21, by means of suitable pins 22 22, which block is preferably apertured and has an operating-rod, as 23, passed therethrough, said rod being secured by a nut 24 or in any other suitable manner. The rod 23 is formed with an angular arm, as 25, which extends laterally from said rod and then is bent to extend parallel therefrom above the same. The parallel or horizontal portion of arm 25 is designed to be passed through an eye 26, formed on the outer end of bolt 17. If desired, rod 23 may be provided with a suitable joint, as 27, or the rod may be formed solid, if found preferable. The free end of rod 27 is preferably formed with an eye 28, designed to engage any suitable locking-stud, as 29, carried by one of the longitudinal beams of the car.

Any preferred form of housing, as 30, may be employed for inclosing the moving parts above described for preventing interference in the operation thereof by any foreign matter.

It will of course be apparent that when head 5 is positioned transversely of the slot formed by notches 4 the doors 2 will be locked in their closed position and that when rod 6 is rotated sufficiently to bring head 5 into register with said slot the said doors will be free to swing open. The parts being in the position illustrated in Fig. 1, the operator releases eye 28 from the stud 29 and rotates the rod 23 sufficiently to withdraw the end of bolt 17 from the slot 10, this result being attained through the engagement of arm 25 with eye 26. The rod 23 is next reciprocated, thereby swinging the lever 11 back and forth with rod 6' as its pivot, the pawl 14 engaging the teeth of ratchet-wheel 13 and rotating said wheel. This operation is continued until the head 5 registers with the slot formed by notches 4, and the doors 2 are then free to swing open, which movement is of course accomplished by the weight of the supported load. When it is desired to close the doors 2, any suitable means may be employed for lifting them to their normal closed position, and the rod 23 is again reciprocated, resulting in the rotation of rod 6' until the head lies in a transverse plane to that of the slot formed by notches 4. The rod 23 is next rotated for throwing forward the bolt 17 again within the slot 10, whereby rods 6' and 6 are locked against rotation, and eye 28 is once more placed in engagement with locking-studs 29, and all the parts are in their initial position.

It will be apparent that the joints employed in the various rods above described are designed to compensate for any slight lateral movements due to sudden strains or jars, whereby is obviated danger of mutilation or breakage.

Although I have specifically set forth one particular embodiment of the present invention, I do not wish to be understood as limiting myself to the exact details enumerated, but shall feel at liberty to deviate therefrom to any degree within the spirit and scope of my invention.

Having fully described my invention, what I claim as new, and desire to secure by Letters Patent, is—

1. The combination with a car provided with trap-doors, of a rod designed to support the same in a closed position, means for locking said rod, devices for releasing said rod's locking means, mechanism for rotating the rod after it is released, and devices connected with said rotating mechanism, adapted, upon reciprocation, to impart such rotation, substantially as set forth.

2. The combination with a car having trap-doors, of means supported within said car for locking said doors in a closed position, mechanism for rotating said locking means, and a reciprocating lever adapted to operate said rotating mechanism, substantially as set forth.

3. The combination with a car having trap-doors, of means supported within said car for locking said doors in a closed position, mechanism for rotating said locking means, such mechanism comprising a ratchet, a lever, a pawl carried by said lever for operating said ratchet, and a second reciprocating lever for actuating the pawl-carrying lever, substantially as set forth.

4. The combination with a car having trap-doors, of a rod held against longitudinal movement and provided with means for supporting said doors in a closed position, a joint formed intermediate the length of said rod, and means for rotating said rod for releasing said door, substantially as described.

5. The combination with a car having trap-doors, of means supported within said car for locking said doors in a closed position, a lever engaging said locking means, and means carried by said lever for releasing the locking means such means comprising a vertically-reciprocating lever connected at one end to first said lever, substantially as described.

6. In a mechanism of the class described the combination with a suitable car having trap-doors, of a rod supporting said doors in a closed position in such manner as to release the same upon rotation, a lever for rotating said rod, and means extending outside said car for operating said lever, substantially as described.

7. In a mechanism of the class described the combination with a suitable car having trap-doors, of a rod supporting said door in a closed position in such manner as to release the same upon rotation, means for locking said rod against rotation, means for releasing said locking means, and means for rotating said rod, substantially as described.

8. In a mechanism of the class described the combination with a suitable car having trap-doors, of means supporting the same in a closed position in such manner as to release the same upon rotation of the supporting means, a ratchet-wheel carried by said supporting means, means for locking said ratchet-wheel against rotation, and means extending outside said car for releasing said locking means and rotating said ratchet-wheel, substantially as described.

9. In a mechanism of the class described the combination with a suitable car having trap-doors, of a rod supporting the same in such manner as to effect their release upon rotation, a ratchet-wheel carried by said rod, a lever pivoted within said car and provided with a pawl engaging said ratchet, and means for swinging said lever upon its pivot for rotating said ratchet-wheel, substantially as described.

10. In a mechanism of the class described the combination with a suitable car having trap-doors, of a rod supporting the same in their closed position in such manner as to effect their release upon rotation, means for locking said rod against rotation, a lever for rotating said rod, and a rod engaging both the locking means and said lever for manipulating the same, substantially as described.

11. In a mechanism of the class described the combination with a suitable car having trap-doors, of a rod supporting the same in such manner as to effect their release upon rotation, said rod being formed with a groove in its upper end, a bolt normally engaging said groove for preventing the rotation of said rod, means for withdrawing the said bolt, and means for rotating said rod, substantially as described.

12. In a mechanism of the class described the combination with a suitable car having trap-doors, of a rod supporting the same in such manner as to effect their release upon rotation, a lever bifurcated and having the arms of its bifurcation pivotally engaging said rod, a ratchet-wheel secured to said rod between the arms of said bifurcation, a pawl pivotally attached to said lever, and means for retaining said pawl in engagement with said ratchet-wheel, substantially as described.

13. In a mechanism of the class described the combination with a suitable car having trap-doors, of a rod supporting the same in such manner as to effect their release upon rotation, a bolt engaging said rod for preventing rotation thereof and provided with an eye at its free end, a lever engaging said rod for rotating the same, a rod engaging the said lever for operating the same, and a bent arm carried by said last-mentioned rod and engaging the eye of said bolt, substantially as described.

14. In a mechanism of the class described the combination with a suitable car having trap-doors, of a rod supporting the same in such manner as to effect their release upon rotation, means for locking said rod against rotation, a lever for rotating said rod having its outer end bifurcated, a swivel-block pivotally mounted between the arms of said bifurcation, and a rod engaging said swivel-block and provided with means engaging said locking means for manipulating the parts, substantially as described.

15. In a mechanism of the class described the combination with a suitable car having trap-doors, of a rod supporting the same in such manner as to effect their release upon rotation, a bolt jointed intermediate its length, a guiding-box inclosing a portion of said bolt beyond the joint, that portion of said bolt beyond the guiding-box being designed to engage said rod for preventing rotation thereof, means for disengaging said bolt from said rod, and means for rotating said rod, substantially as described.

In testimony whereof I hereunto affix my signature in presence of two witnesses.

JOHN J. GALWAY.

Witnesses:
JAMES T. WATSON,
H. W. MERCHANT.